United States Patent
Hall et al.

(10) Patent No.: US 8,588,999 B2
(45) Date of Patent: Nov. 19, 2013

(54) METHOD AND SYSTEM FOR ENGINE EMISSION CONTROL

(75) Inventors: Edward Joseph Hall, Fairview, PA (US); Kyle Stott, Erie, PA (US); Ajith Kuttannair Kumar, Erie, PA (US); James Robert Mischler, Erie, PA (US); Christopher Mcnally, Girard, PA (US); Jason Dean, Erie, PA (US)

(73) Assignee: General Electric Company, Schenectady, NY (US)

( * ) Notice: Subject to any disclaimer, the term of this patent is extended or adjusted under 35 U.S.C. 154(b) by 559 days.

(21) Appl. No.: 12/841,764

(22) Filed: Jul. 22, 2010

(65) Prior Publication Data

US 2012/0022728 A1    Jan. 26, 2012

(51) Int. Cl.
    *F02D 28/00*    (2006.01)
    *F02D 41/18*    (2006.01)

(52) U.S. Cl.
    USPC ............. 701/19; 701/102; 123/445; 123/447; 123/677

(58) Field of Classification Search
    USPC ................................. 123/445, 677
    See application file for complete search history.

(56) References Cited

U.S. PATENT DOCUMENTS

| | | | |
|---|---|---|---|
| 5,703,777 A | 12/1997 | Buchhop et al. | |
| 5,775,295 A | 7/1998 | Aubourg et al. | |
| 6,442,455 B1 | 8/2002 | Kotre et al. | |
| 6,823,675 B2 | 11/2004 | Brunell et al. | |
| 7,206,646 B2 | 4/2007 | Nixon et al. | |
| 7,630,823 B2* | 12/2009 | Gallagher et al. | 701/105 |
| 8,090,521 B2* | 1/2012 | Goes et al. | 701/105 |
| 8,103,429 B2* | 1/2012 | Sivasubramaniam et al. | 701/109 |
| 2002/0188397 A1* | 12/2002 | Biess et al. | 701/112 |
| 2003/0136177 A1* | 7/2003 | Hendren et al. | 73/23.31 |
| 2003/0216855 A1* | 11/2003 | Liang et al. | 701/114 |
| 2004/0194447 A1* | 10/2004 | Roby | 60/285 |
| 2006/0096273 A1 | 5/2006 | Soliman et al. | 60/285 |
| 2006/0178800 A1* | 8/2006 | Chen et al. | 701/105 |
| 2008/0201054 A1* | 8/2008 | Grichnik et al. | 701/102 |
| 2009/0055078 A1* | 2/2009 | Chen et al. | 701/103 |
| 2009/0107456 A1* | 4/2009 | Pallett et al. | 123/299 |
| 2010/0043753 A1* | 2/2010 | Gallagher et al. | 123/447 |
| 2010/0145628 A1* | 6/2010 | Ramamurthy et al. | 702/23 |
| 2011/0283682 A1* | 11/2011 | Gallagher et al. | 60/274 |
| 2012/0089278 A1* | 4/2012 | Goes et al. | 701/19 |

* cited by examiner

*Primary Examiner* — James Trammel
*Assistant Examiner* — Demetra Smith-Stewart
(74) *Attorney, Agent, or Firm* — GE Global Patent Operation; John A. Kramer (57) ABSTRACT

Methods and systems are provided for improving a balance between engine fuel economy and exhaust emissions in an off-highway vehicle. One example method includes adjusting an engine injection timing based on an ambient NOx level estimated by a NOx sensor in the engine intake. Another example method includes adjusting a trip plan with a time in notch duty cycle based on a deviation from the time in notch duty cycle from a reference duty cycle.

21 Claims, 5 Drawing Sheets

METHOD AND SYSTEM FOR ENGINE EMISSION CONTROL

FIELD

The subject matter disclosed herein relates to methods and systems for controlling exhaust emissions from a combustion engine. The combustion engine could be installed at a particular geographic location or installed in or on a vehicle, such as a locomotive, railcar, aircraft, automobile, or marine vessel.

BACKGROUND

Locomotive engine control systems can be configured to optimize engine performance parameters to improve fuel economy and reduce greenhouse gas emissions. However, optimizations focusing on fuel economy can lead to elevated NOx levels. At the same time, stringent government regulations require NOx emissions to be maintained within a threshold. Optimization routines configured to reduce exhaust NOx levels can lead to a drop in fuel economy and elevated $CO_2$, and other greenhouse gas, emissions. In other words, trade-offs between NOx emissions and fuel economy may be challenging.

BRIEF DESCRIPTION OF THE INVENTION

Methods and systems are provided for operating a combustion engine to dynamically adjust exhaust emissions based on ambient operating conditions. In one embodiment, the method includes adjusting an engine injection timing based on an ambient NOx level estimated by a first NOx sensor in an air intake of the engine.

In one example, the combustion engine is in an off-highway vehicle, such as a locomotive. The locomotive is configured with a (first) regulated emissions sensor in the engine intake to estimate an ambient level of a corresponding regulated emission. In one example, the regulated emissions sensor is a NOx sensor. The NOx sensor provides a real-time, or near real-time (that is, real time but for any sensing and processing delays), estimate of an ambient NOx level, that is, of ambient NOx conditions (that is, NOx conditions of the geographical region the engine is travelling through, external to the engine exhaust system). Based on the estimated ambient NOx level, engine operations of the locomotive are adjusted. For example, when the ambient NOx levels are greater than a predetermined threshold, that is, the locomotive engine is travelling through a high NOx region, engine operations are adjusted to reduce exhaust NOx levels, at the cost of reduced fuel economy and increased $CO_2$ and greenhouse gas emissions. For example, in one embodiment, injection timing is retarded (such as, by a higher amount) when the ambient NOx level equals or exceeds the predetermined threshold. By reducing the exhaust NOx, emissions compliance may be achieved. In comparison, when the ambient NOx levels are below the predetermined threshold, that is, the locomotive engine is travelling through a low NOx region, engine operations may be adjusted to improve fuel economy and reduce emission $CO_2$ levels, at the cost of increased exhaust NOx levels. For example, injection timing is advanced, or retarded by a smaller amount. By allowing higher NOx emissions in geographic regions with low ambient NOx levels, fuel economy is achieved while still being overall emissions compliant.

In another example, the engine is in a train configured with a plurality of locomotives, and the engine injection timing for each locomotive engine is adjusted based on the ambient regulated emission level (for example, ambient NOx level) estimated by a corresponding regulated emission sensor (for example, NOx sensor) in each locomotive's engine intake. Alternatively, the engine injection timing for an engine of a remote locomotive is adjusted based on an ambient regulated emission level (for example, NOx level) experienced at a lead locomotive, as estimated by a NOx sensor in the engine intake of an engine in the lead locomotive. As such, the ambient NOx levels for different locomotives of the same train can vary at a given time due to various reasons. In one example, the ambient NOx levels for each locomotive may vary due to the length of the train being such that a lead locomotive is situated in a geographic region with a different air quality, and consequently a different NOx level, than a remote locomotive. In another example, the ambient NOx levels for each locomotive may vary due to recycling of exhaust from one locomotive (such as an upstream, or lead, locomotive) into the intake of another locomotive (such as a downstream, or remote, locomotive). Thus, in one example, the engine injection timing of a remote locomotive is further adjusted based on a distance of the remote locomotive from the lead locomotive (for example, as indicated by a number of cars coupled between the lead locomotive and remote locomotive). Further, each locomotive may be assigned a different predetermined threshold. In one example, the NOx threshold for a given locomotive may be increased as a distance of the given locomotive from a lead locomotive increases. This allows the increased ambient NOx that may be experienced by a downstream locomotive due to the exhaust NOx from a large number of upstream locomotives to be compensated for. In another example, the ambient NOx levels for each locomotive may vary due to the length of the train being such that a lead locomotive is situated in a geographic region with a different NOx level than a remote locomotive.

Diagnostic routines are performed based on differences between ambient NOx levels and exhaust NOx levels. For example, based on the ambient NOx level estimated by the intake NOx sensor, and further based on engine operating conditions, an exhaust NOx level is inferred. Alternatively, the exhaust NOx level may be determined by an exhaust NOx sensor. In response to a difference between the ambient NOx level and the exhaust NOx level being greater than a threshold, degradation may be determined and a diagnostic code may be accordingly set.

While the above example illustrates adjustment of engine operations to enable management of exhaust NOx levels, it will be appreciated that the same may be applied towards the management of other regulated emissions, such as carbon monoxide, sulfur, particulate matters, etc. In this way, engine operations are varied in real-time based on regional changes in air quality. By adjusting engine operations based on an ambient level of a regulated exhaust emission, trade-off between an engine's emissions performance and fuel economy may be improved.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Reference is now made briefly to the accompanying drawings, in which.

Like reference characters designate identical or corresponding components and units throughout the several views, which are not to scale unless otherwise indicated.

DETAILED DESCRIPTION

Figure 1:
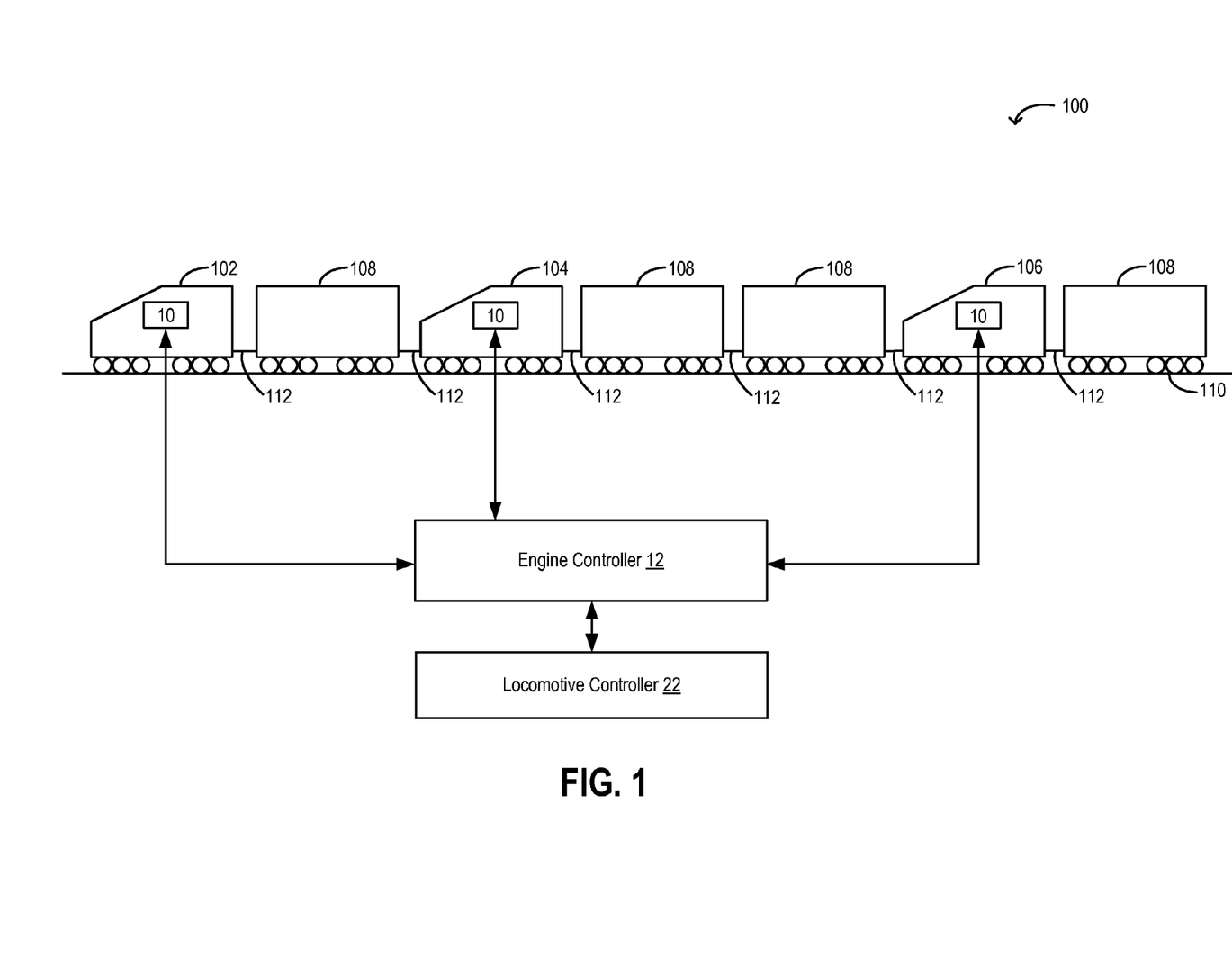
FIG. 1 shows an example embodiment of a train including a plurality of locomotives.
Figure 2:
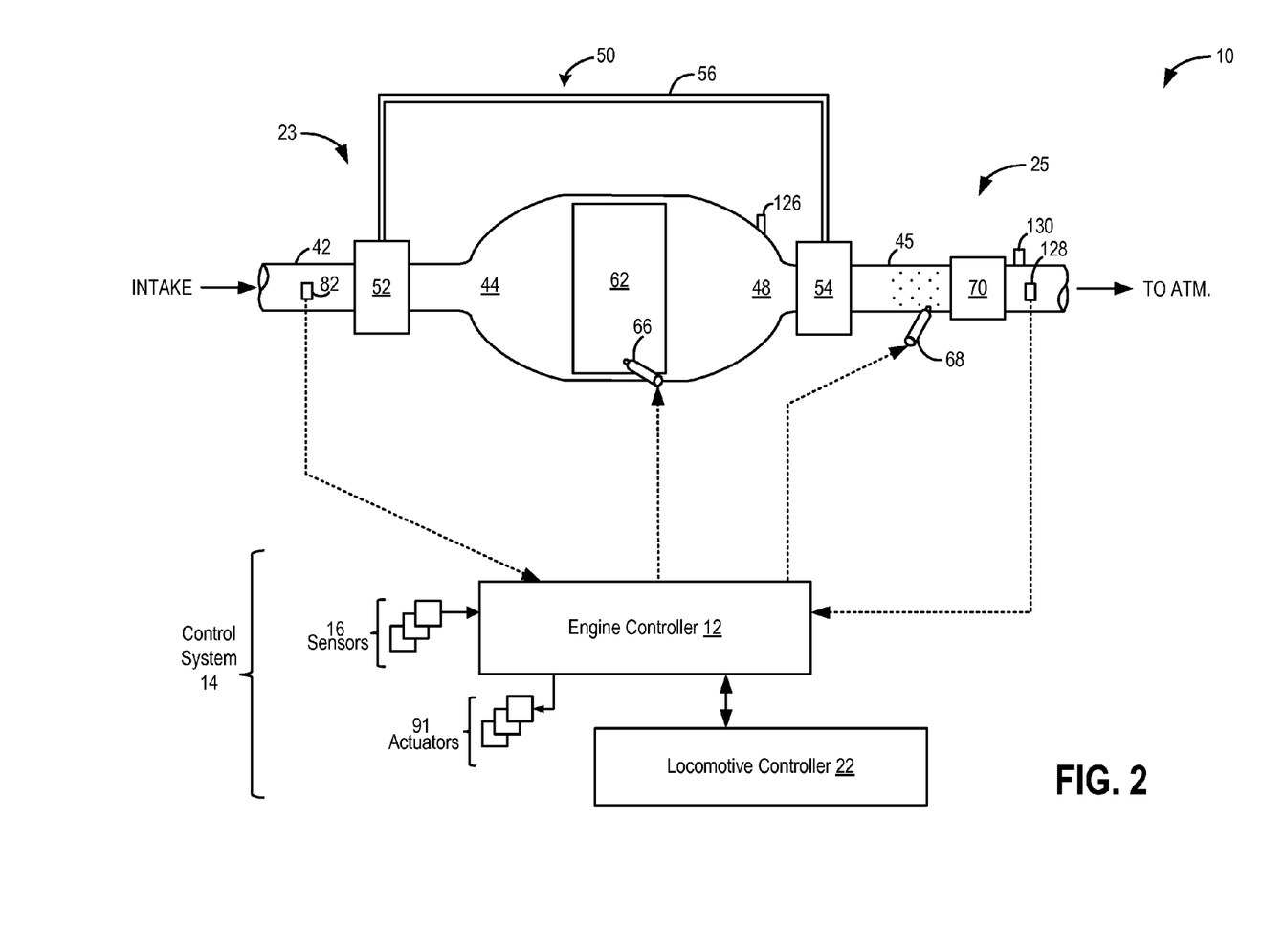
FIG. 2 shows an example locomotive engine system including an intake NOx sensor.
Figure 3:
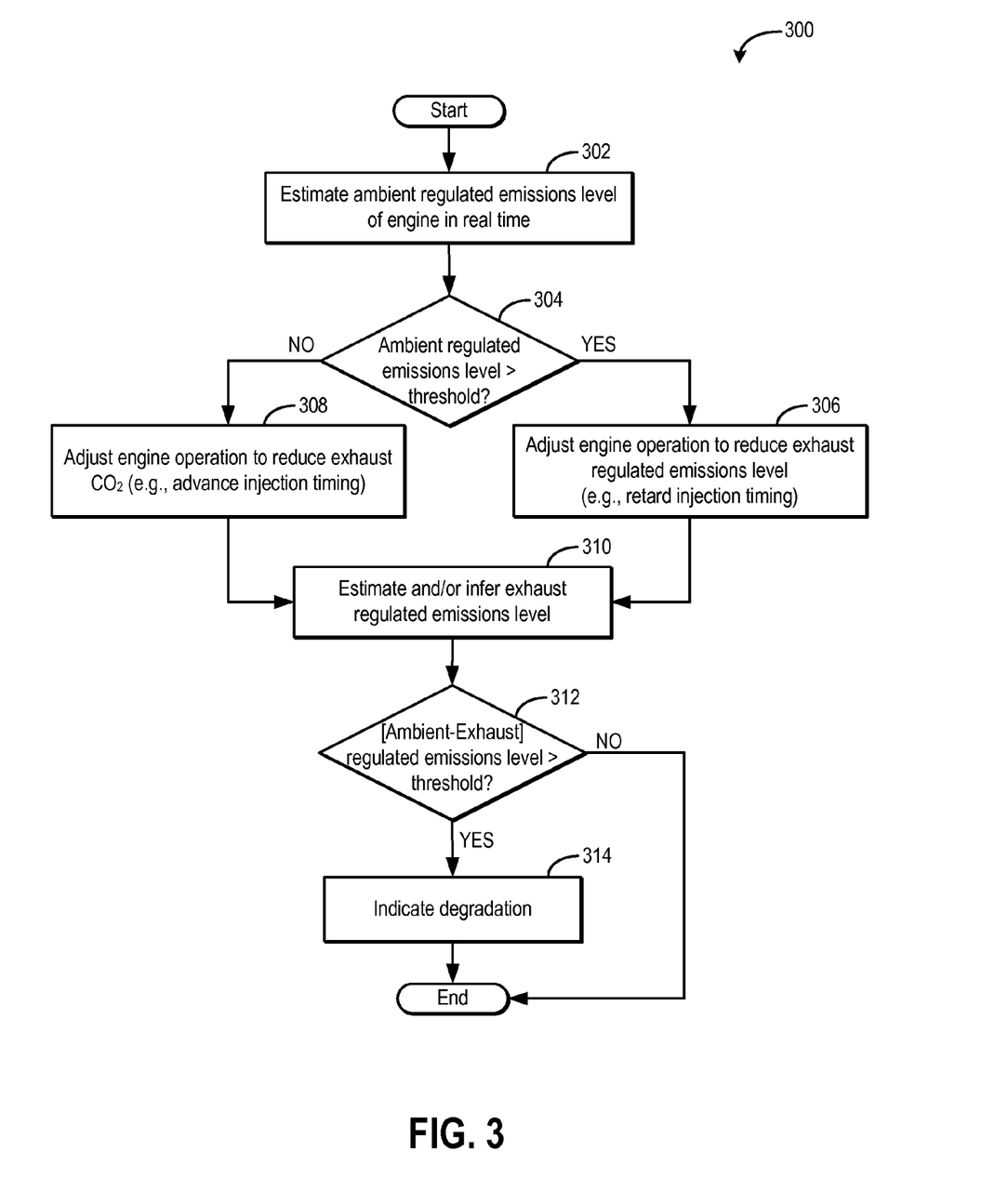
FIG. 3 shows a high level flow chart of a method for adjusting engine operation responsive to an ambient regulated emissions level.
Figure 5:
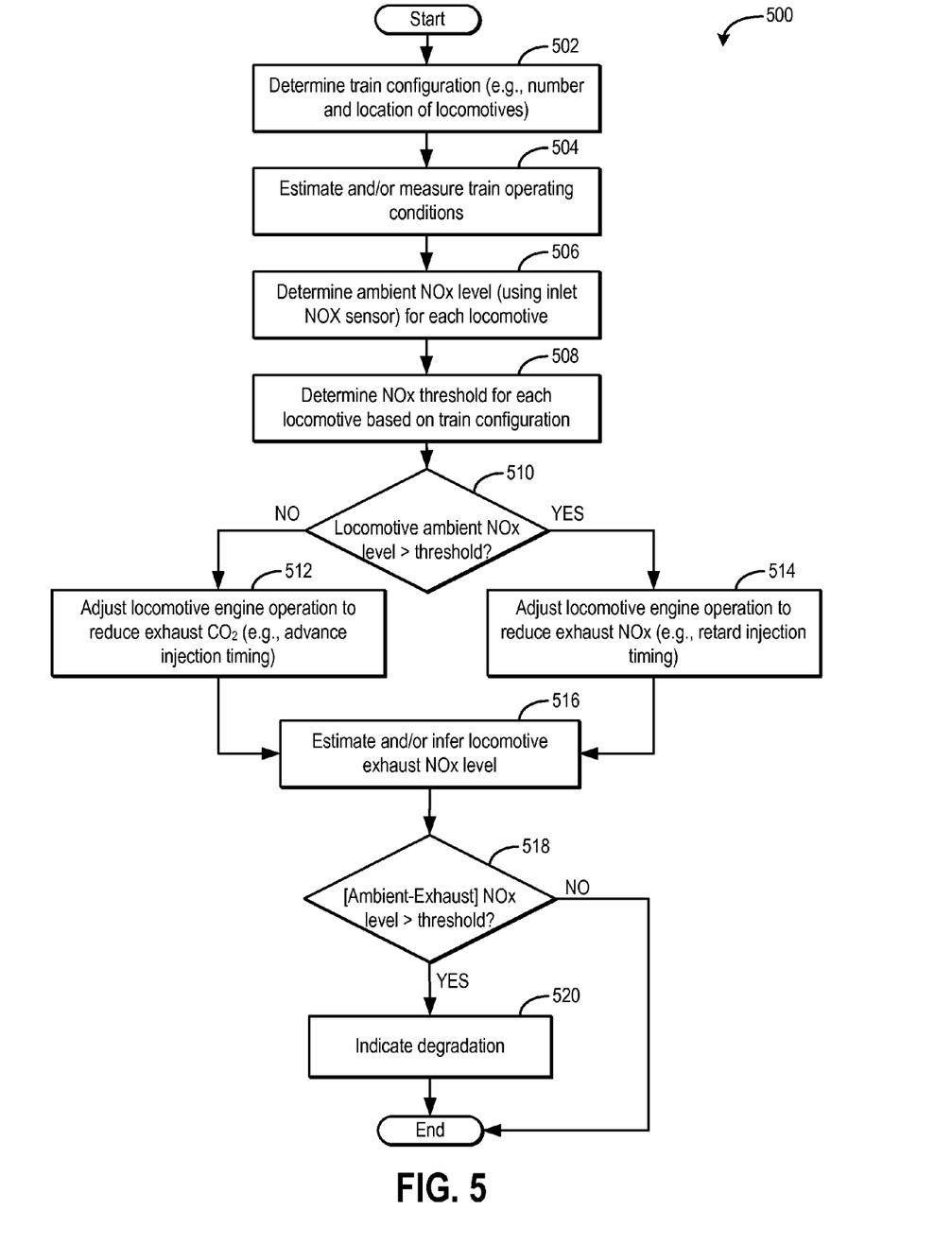
FIG. 5 shows a high level flow chart of a method for adjusting engine operations of a locomotive responsive to an ambient NOx level.

Combustion engines may be configured with a regulated emissions sensor in the air inlet or intake to provide an estimate of an ambient level of a regulated emission, such as NOx or $CO_2$. Such combustion engines may be located in or on a vehicle, such as in a locomotive, as shown in FIG. 1. Alternatively, the engine may be a stand-alone engine, such as a generator (not shown). One example of such an engine system including an intake NOx sensor is illustrated in FIG. 2. As shown in FIG. 3, an appropriately configured engine controller, which may be software, hardware, firmware or a combination thereof, adjusts operations of the engine based on a real-time, or near real-time, detection and/or estimate of an ambient regulated emission level (in the depicted example, illustrated with reference to an ambient NOx level). For example, as illustrated in FIG. 5, a controller adjusts engine fuel injection timing responsive to the ambient NOx level detected by a NOx sensor in or coupled with the engine's air intake. In one example, when the ambient NOx level is higher than a predetermined threshold, the controller retards an engine injection timing to thereby reduce exhaust NOx levels. While this may temporarily decrease the engine's fuel's economy, it allows the engine to be overall emissions compliant. In another example, when the ambient NOx level is lower than the predetermined threshold, the controller advances the injection timing (or retards the injection timing by a relatively lower amount) to thereby reduce exhaust $CO_2$ levels, and improve fuel economy, at the cost of a temporary increase in exhaust NOx levels. In this way, by adjusting engine operations based on the ambient level of a regulated emission (herein, NOx level), a better balance between fuel economy and emissions compliance may be achieved.

Figure 4:
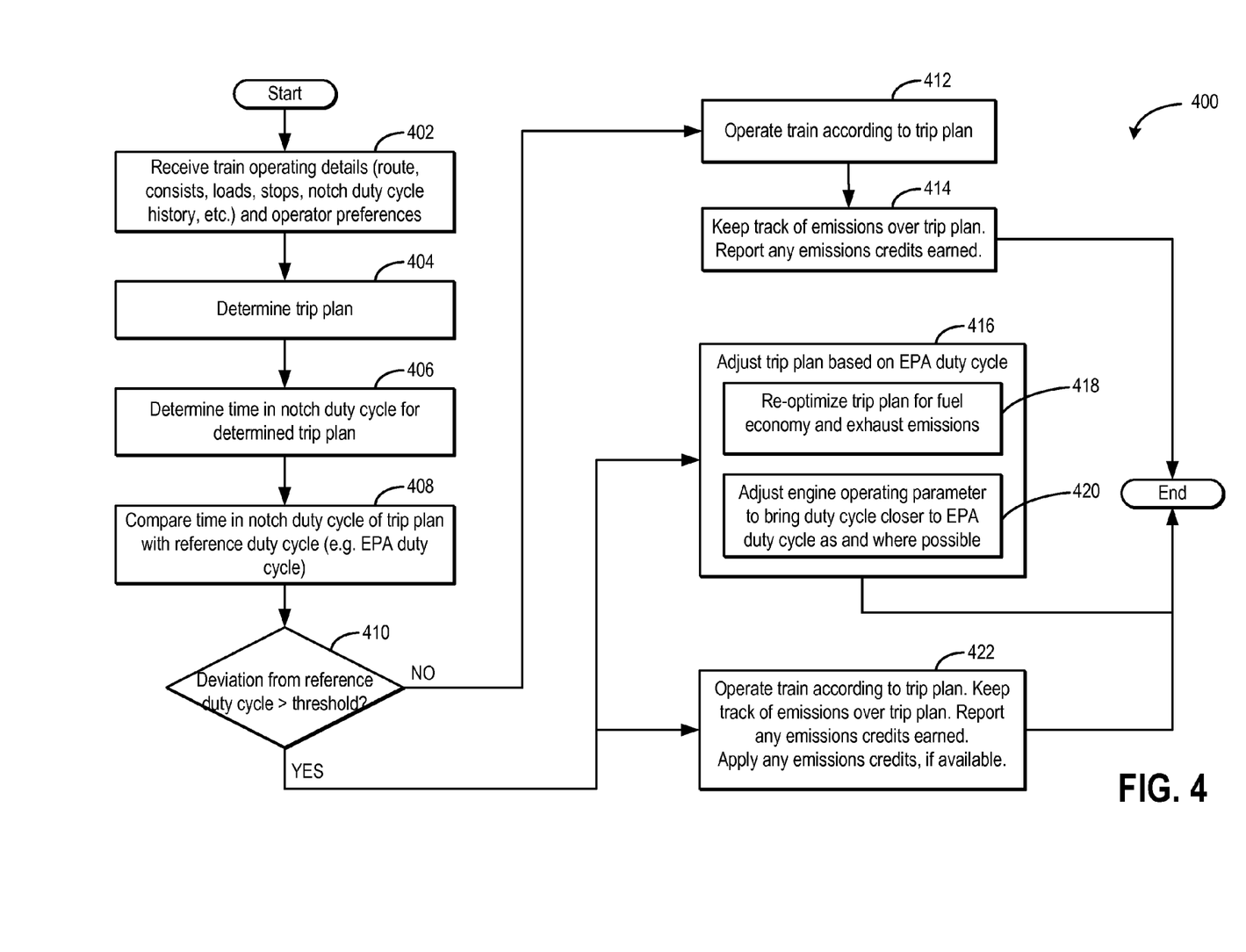
FIG. 4 shows a high level flow chart of a method for adjusting a trip plan of a train based on a time in notch duty cycle.

As detailed in FIG. 4, the engine controller can also be configured to balance engine fuel economy with exhaust emissions by adjusting locomotive operations based on a deviation of a time in notch duty cycle for a given vehicle trip plan from reference duty cycle (such as, an EPA duty cycle). In one example, the controller completely reconfigures a trip plan to meet a weighted preference for fuel economy and exhaust emissions. In another example, the controller partially reconfigures segments of a trip plan to nudge the plan settings closer to a reference duty cycle. Additionally, the controller may earn and apply emissions credits as and when possible. By improving balance between fuel economy and exhaust emissions relative to ambient regulated emissions levels, compliance with geography-specific emissions regulations may be achieved.

FIG. 1 depicts an example train 100, including a plurality of locomotives 102, 104, 106 and a plurality of cars 108, configured to run on track 110. The plurality of locomotives 102, 104, 106 include a lead locomotive 102 and one or more remote locomotives 104, 106. While the depicted example shows three locomotives and four cars, any appropriate number of locomotives and cars may be included in train 100.

Locomotives 102, 104, 106 are powered by engine 10, while cars 108 may be non-powered. In one example, locomotives 102, 104, 106 may be diesel-electric locomotives powered by diesel engines. However, in alternate embodiments, the locomotive may be powered with an alternate engine configuration, such as a gasoline engine, a biodiesel engine, a natural gas engine, or wayside (e.g., catenary, or third-rail) electric, for example.

Locomotives 102, 104, 106 and cars 108 are coupled to each other through couplers 112. While the depicted example illustrates locomotives 102, 104, 106 connected to each other through interspersed cars 108, in alternate embodiments, the one or more locomotives may be connected in succession, as a consist, while the one or more cars 108 may be coupled to a remote locomotive (that is, a locomotive not in the lead consist) in succession.

A locomotive controller 22 is configured to receive information from, and transmit signals to, each of the locomotives of train 100. For example, locomotive controller 22 may receive signals from a variety of sensors on train 100, and adjust train operations accordingly. The locomotive controller 22 may be coupled to an engine controller 12 for adjusting engine operations of each locomotive. As elaborated with reference to FIGS. 2, 3, and 5, engine controller 12 receives a signal regarding an ambient NOx level of each locomotive from a NOx sensor in the respective locomotive's engine air intake. Based on the ambient NOx level, the engine controller 12 then adjusts an engine injection timing of the locomotive to accordingly reduce exhaust NOx levels at the cost of elevated $CO_2$ levels and lower fuel economy, or reduce exhaust $CO_2$ levels and improve fuel economy at the cost of elevated exhaust NOx levels. In other words, the engine controller 12 may balance fuel economy and emissions compliance based on ambient regulated emission levels.

FIG. 2 depicts an example engine system 10 that may be included in each of the locomotives (102, 104, 106) of train 100 (FIG. 1). In one example, engine 10 may be a diesel engine. However, in alternate embodiments, alternate engine configurations may be employed, such as a gasoline engine, a biodiesel engine, a natural gas engine, or a gas turbine engine (turbojet, turbofan, turboprop, turboshaft), for example.

Engine 10 has an intake 23 and an exhaust 25. The exhaust 25 has an exhaust manifold 48 leading to an exhaust passage 45 that routes exhaust gas to the atmosphere. The one or more emission control devices 70 are coupled with the exhaust passage 45. The one or more emission control devices 70 detect and monitor levels of regulated emission levels of one or more substances that are present in the exhaust gases, which flow through the exhaust passage 45. Non-limiting examples of the one or more emission control devices are a three-way catalyst, lean NOx trap, oxidation catalyst, etc. Fluids required for an emission control device catalyst, such as a catalyst reductant (urea, ammonia, etc.) may be injected into the exhaust passage 45 upstream of the one or more emission control devices 70 through a reductant injector 68.

In one embodiment, as depicted, engine 10 further includes a boosting device, such as a turbocharger 50, including a compressor 52 arranged along intake passage 42. Compressor 52 is at least partially driven by a turbine 54, arranged along exhaust passage 45, via shaft 56. In alternate embodiments, the boosting device may be a supercharger, wherein compressor 52 is at least partially driven by the engine and/or an electric machine, and may not include a turbine.

In such an embodiment, the intake manifold 44 is configured to receive a boosted air charge, which is air from intake passage 42 that is directed through and compressed by compressor 52, and to direct the boosted air charge into a bank of cylinders 62. In one example, an intercooler (not shown) can be included in intake manifold 44, downstream of compressor 52, to reduce the temperature of the boosted air charge supplied to the bank of cylinders 62.

A first regulated emissions level sensor 82 is positioned in, or coupled with, intake passage 42 to detect and/or estimate an ambient regulated emissions level. In one example, as depicted, regulated emissions level sensor 82 is a NOx sensor. Based on the detected and/or estimated ambient regulated emissions level (herein NOx level), controller 12 may be configured to adjust operations of engine 10, for example, by adjusting an engine injection timing (e.g., fuel injector injection timing) for fuel injected into the bank of cylinders 62 by fuel injector 66. As elaborated with reference to FIG. 3, by adjusting the engine injection timing based on the ambient regulated emission levels, a better trade-off between engine fuel economy and emissions levels may be achieved. In one example, as the ambient regulated emissions level for a given engine equals or exceeds a predetermined threshold, the engine's injection timing may be retarded to reduce an amount of a regulated emission substance, such as NOx, that is present in the engine's exhaust. As such, this may lead to a temporary drop in engine fuel economy and a temporary increase in the level(s) of other substances present in the engine's exhaust, such as $CO_2$. In another example, if the ambient regulated emission levels (for example, ambient NOx levels) for a given engine is below the predetermined threshold, the injection timing may be advanced (or retarded by a lesser amount) to reduce an amount of exhaust $CO_2$ and improve engine fuel economy. As such, this may lead to a temporary increase in the exhaust NOx levels.

In a rail embodiment, the ambient NOx level for a given locomotive may vary based on the configuration of the train. For example, the ambient NOx level may vary as a distance of a locomotive from a lead locomotive increases. This may be in part due to recycling of exhaust from upstream locomotives (such as a lead locomotive) to the intake of downstream locomotives (such as a remote locomotive). For example, a lead locomotive may experience a lower ambient NOx level, a first remote locomotive at a first distance from the lead locomotive may experience a higher ambient NOx level, while a second remote locomotive at a second distance, more than the first distance, from the lead locomotive, may experience a yet higher ambient NOx level. A lead locomotive may also experience a lower ambient NOx level than a remote locomotive due to a length of the train being such that the lead locomotive and the remote locomotive are in different geographical regions with different air qualities. Further still, the ambient NOx levels experienced by the locomotive may be affected by the presence of a tunnel. Specifically, when passing through a tunnel, the ambient NOx levels estimated may be artificially elevated due to the presence of an enclosure.

In one example, due to the variation of ambient NOx levels between locomotives, each locomotive may be assigned a distinct NOx threshold, the threshold adjusted based on the configuration of the train and the location of a given locomotive (such as, the location of the given locomotive vis-à-vis a lead locomotive). In one example, the threshold may be increased as a distance from the lead locomotive increases. Herein, the injection timing for each locomotive may be adjusted independently based on the given locomotive's estimated ambient NOx level and the locomotive's location. The thresholds may also be adjusted (for example, increased) when the train passes through tunnels.

As used herein, adjustment of engine injection timing (e.g., fuel injector injection timing) may include adjusting a start of injection timing, and/or adjusting an end of injection timing. For example, an injector may have an opening timing, an opening duration, and a closing timing. The opening duration, among other parameters such as injection pressure, may be adjusted to control the amount of fuel injection. However, even while maintaining the amount of fuel injection at the same desired level, the timing of when, in relation to piston motion or the combustion cycle, the fuel is delivered, may also be adjusted. As noted above, the amount of fuel delivered may be maintained, yet the timing relative to the piston motion may be delayed (retarded), or advanced, by delaying (or advancing) both the opening and closing of the injector opening.

A second regulated emissions level sensor 128 may be included in exhaust passage 45 to provide an estimate of regulated emissions levels of the engine exhaust before entry into the atmosphere. In one example, the second regulated emissions level sensor may be a second NOx sensor. In alternate embodiments, the estimate of the regulated emissions level in the engine exhaust may be inferred based on engine operating conditions. For example, an exhaust NOx level may be estimated (that is, sensed) by a second NOx sensor coupled to the engine exhaust, or may be inferred based on engine operating conditions including one or more of an engine speed, engine load, engine temperature, catalyst temperature, etc. A comparison of ambient regulated emissions levels and regulated emissions levels in the exhaust gas may also be used for diagnostic purposes. In one example, degradation may be determined based on a difference between the ambient NOx level and the (inferred or estimated) exhaust NOx level exceeding a threshold.

While the depicted example illustrates adjusting engine operations based on an ambient NOx level, it will be appreciated that similar routines may be applicable for alternate or additional regulated emissions such as sulfur (S) emissions, particulate matter emissions (PMs), carbon dioxide ($CO_2$), carbon monoxide (CO), etc. That is, in alternate embodiments, an engine injection timing, such as for an engine in a locomotive, may be adjusted based on an ambient regulated emissions level for that locomotive, as estimated by a corresponding regulated emissions sensor in the engine air intake of that locomotive.

Engine 10 may be controlled at least partially by control system 14 including engine controller 12, and by input from a vehicle operator via an input device (not shown). Engine controller 12 is shown receiving information from a plurality of engine sensors 16 (various examples of which are described herein) and sending control signals to a plurality of engine actuators 91 (various examples of which are described herein). As one example, engine sensors 16 may include exhaust gas sensor 126 (e.g., an exhaust $O_2$ sensor) located in, or coupled with, the exhaust manifold 48, exhaust temperature sensor 130 located downstream of emission control device 70, (first) intake regulated emissions level sensor 82, etc. Various other sensors such as additional pressure, temperature, air/fuel ratio and alternate regulated emissions sensors may be coupled to various locations in engine 10. As another example, engine actuators 91 may include fuel injectors 66, reductant injector 68, and a throttle, if equipped. Other actuators, such as a variety of additional valves, may be coupled to various locations in engine 10. Engine controller 12 may receive input data from the various engine sensors, process the input data, and trigger the engine actuators in response to the processed input data based on instruction or code programmed therein corresponding to one or more routines. An example control routine is described herein with regard to FIGS. 3 and 5.

Engine controller 12 may be coupled to a locomotive controller 22, for example via a digital communication channel or data bus. Locomotive controller 22 may be located on the same locomotive, or may be remotely located, for example, at a dispatch center. Locomotive controller 22 may receive information from a plurality of locomotive sensors and may send control signals to a plurality of locomotive actuators. Example locomotive sensors may include locomotive position sensors (e.g., GPS device), environmental condition sensors (e.g., for sensing altitude, ambient humidity, temperature, and/or barometric pressure, or the like), locomotive coupler force sensors, a track grade sensors, locomotive notch sensors, brake position sensors, etc. Various other sensors may be coupled to various locations in the locomotive. Example locomotive actuators may include a locomotive throttle notch, air brakes, brake air compressor, traction motors, etc. Other actuators may be coupled to various locations in the locomotive. Locomotive controller 22 may receive inputs from the various locomotive sensors, process the data, and trigger the locomotive actuators in response to the processed input data based on instruction or code programmed therein corresponding to one or more routines. For example, the locomotive controller may determine a locomotive trip plan including locomotive notch and brake settings based on the locomotive operating conditions. Further, locomotive controller 22 may receive engine data (as determined by the various engine sensors, such as intake NOx sensor 82) from engine controller 12, process the engine data, determine engine actuator settings, and transfer (e.g., download) instructions or code for triggering the engine actuators based on routines performed by the locomotive controller 22 back to engine controller 12. In one example, locomotive controller 22 may determine a trip plan including notch settings based on engine operating conditions and operator preferences, and engine injection settings based on the engine operating conditions and the ambient levels of one or more regulated emissions. Based on deviations of the trip plan's time in notch duty cycle from a reference duty cycle (such as an EPA duty cycle), the locomotive controller 22 may reconfigure the trip plan. For example, based on the deviation, the controller may readjust cost functions and constraints imposed during trip planning and related optimization routines. In one example, as the train opr locomotive's actual duty cycle starts deviating from the reference duty cycle, thereby leading to increased exhaust emissions, locomotive controller 22 may readjust notch settings for a trip plan so to impose fuel economy and exhaust emissions as constraints. An example control routine for reconfiguring a trip plan based on deviations from a predetermined notch duty cycle is described herein with regard to FIG. 4.

Now turning to FIG. 3, an example method 300 is depicted for adjusting the operation of an engine responsive to an ambient level of a regulated emission. As such, the engine may be located in or on a vehicle, such as an off-highway vehicle (e.g., a locomotive), an aviation vehicle (e.g., an aircraft), a marine vehicle (e.g., a ship), etc. Alternatively, the engine may be a stand-alone engine, such as a generator (e.g., a generator affixed to a railcar, or the deck of a ship or barge, or a generator at a power plant).

At 302, an ambient regulated emissions level is estimated in real time, or near real time (that is, real time except for processing and sensing delays). The ambient regulated emissions level provides an estimate of the level of the selected regulated emissions in the ambient air received in the engine intake, that is, the ambient air quality. The ambient regulated emissions level is estimated by a first ambient regulated emissions level sensor (such as sensor 82 of FIG. 2) in the engine intake. As such, the sensor estimates the level of the selected regulated emissions at the geographical location of the engine. The regulated emissions may be, for example, CO, S, NOx, $CO_2$, PMs, etc. At 304, it may be determined whether the estimated ambient regulated emissions level is greater than a threshold. As such, the threshold may vary based on the geographical location of the engine. If the estimated ambient regulated emissions level is greater than the threshold, then at 306, an engine operating parameter may be adjusted to reduce the level of the regulated emission in the exhaust gas released by the engine into the atmosphere. In one example, the engine operating parameter adjusted may be the engine injection timing. Thus, for example, the engine injection timing may be retarded as the estimated ambient regulated emissions level exceeds the threshold. In comparison, if the estimated ambient regulated emissions level is lower than the threshold, then at 308, an engine operating parameter may be adjusted to reduce the level of an alternate substance in the engine exhaust, such as an exhaust $CO_2$ level. Thus, for example, the engine injection timing may be advanced (or retarded by a relatively smaller amount) when the estimated ambient regulated emissions level is lower than the threshold. Additionally, or optionally, engine operations may be adjusted to increase the fuel economy of the engine when the estimated ambient regulated emissions level is lower than the threshold.

The estimated ambient regulated emissions level may also be used for diagnostic purposes. Specifically, at 310, an exhaust regulated emissions level (that is, a level of the regulated emissions in the exhaust released from the engine into the atmosphere) may be estimated and/or measured. In one example, the exhaust regulated emissions level may be inferred based on the ambient regulated emissions level (that is, in the engine air intake) and further based on engine operating conditions such as engine speed, engine load, engine temperature, etc. In another example, the exhaust regulated emissions level may be estimated by a second regulated emissions sensor in the engine exhaust (such as sensor 128 of FIG. 2). At 312, the ambient regulated emissions level may be compared to the exhaust regulated emissions level and it may be determined whether the difference is greater than a threshold. At 314, degradation may be indicated in response to a difference between the ambient regulated emissions level and the exhaust regulated emissions level exceeding a threshold. Degradation may be indicated, for example, by setting a diagnostic code or illuminating a degradation indication light. If the difference does not exceed the threshold, the routine may end.

It will be appreciated that while the depicted example shows adjusting the engine operation based on the ambient level of a selected regulated emissions, in alternate embodiments, the adjustment may be based on one or more selected regulated emissions, the different regulated emissions having differing weighted averages. Further still, the selected regulated emissions may vary based on the geographical location of the engine. Thus, in one example, when the engine is in a first geographical location, engine operations may be adjusted based on the ambient level of a first regulated emission. Then, when the engine is in a second geographical location, engine operations may be adjusted based on the ambient level of a second regulated emission. For example, in a first location, engine operations may be adjusted based on ambient NOx levels, and in a second location, engine operations may be adjusted based on ambient CO levels.

Now turning to FIG. 5, an example method 500 is described for adjusting an engine operation for an engine in a rail embodiment (that is, in a train) responsive to an ambient level of a selected regulated emission (herein NOx). Specifically, engine operations for each locomotive engine of a train may be adjusted based on the ambient regulated emissions level for a given locomotive and a lead locomotive, and further based on a train configuration.

At 502, a train configuration is determined. The train configuration may be determined by a locomotive controller, for example, by receiving (e.g., downloading) information regarding the train configuration from a dispatch center. Alternatively, the train configuration may be entered into the locomotive controller by an operator on board the train. Determining a train configuration includes, for example, determining a number and location of locomotives and cars, and/or locomotive consists in the train. At 504, train operating conditions are estimated and/or measured. This includes, for example, a train altitude, an ambient temperature, weather conditions along the route, track grade, track conditions, etc. This further includes determining engine operating conditions for each locomotive including an engine speed, engine torque, an amount of boost, engine oil temperature, compressor air pressure, main air reserve pressure, battery voltage, a battery state of charge, brake cylinder pressure, etc. At 506, an ambient regulated emissions level is determined for each locomotive in the train. In one example, the ambient regulated emissions level are detected or estimated by a first regulated emission levels sensor in the engine air intake, such as a first NOx sensor in the engine air intake. In another example, where the train includes a plurality of locomotives, an ambient NOx level for each locomotive is estimated by a NOx sensor in the engine intake of each locomotive.

At 508, a NOx threshold is determined for each locomotive based on the train's configuration, as determined at 502. As such, an ambient NOx level for a given locomotive can vary not only based on the geographical location of the locomotive, but also based on the configuration of the train. In one example, an ambient NOx level of a locomotive may increase as a distance of the given locomotive from a lead locomotive increases. This may be, in part, due to recycling of exhaust gas from an upstream locomotive (that is, one closer to the head of the train and/or the lead locomotive) to the intake of downstream locomotives (that is, one closer to the tail of the train and/or the most remote locomotive). For example, a lead locomotive can experience a lower ambient NOx level, a first remote locomotive at a first distance from the lead locomotive may experience a higher ambient NOx level, while a second remote locomotive at a second distance, more than the first distance, from the lead locomotive, may experience a yet higher ambient NOx level. Thus, based on the differences, a threshold for each locomotive is adjusted based on a distance of a given locomotive from a lead locomotive. In one example, the adjustment includes increasing the threshold for a given locomotive as the distance of the given locomotive from the lead locomotive increases.

The ambient NOx level estimated by the intake NOx sensor can also be affected by the passing of the train through enclosed areas, such as a tunnel. Specifically, in tunnels the ambient NOx levels experienced can be artificially elevated. To compensate for this, the threshold (for some or all locomotives of the train) may be further increased when the train is in the tunnel. A lead locomotive can also experience a lower ambient NOx level than a remote locomotive due to a length of the train being such that the lead locomotive and the remote locomotive are in different geographical regions with different air qualities. Thus, by estimating an ambient NOx level for each locomotive using a dedicated sensor and by adjusting the threshold for each locomotive based on the locomotive's location with respect to a lead locomotive, the above mentioned factors are better accounted for.

At 510, the estimated ambient NOx level of a given locomotive is compared to the respective threshold. Accordingly, engine injection timing is adjusted based on the ambient NOx level estimated by the (first) NOx sensor in the given locomotive's engine intake. Specifically, if the estimated ambient NOx level exceeds the threshold, that is, there is already high NOx levels in the air, then at 514, engine operations for the given locomotive are adjusted to reduce exhaust NOx emissions so as to make the engine more emissions compliant. In one example, the adjustment includes retarding engine injection timing (for example, retarding by a first amount) as the ambient NOx level exceeds the threshold so as to reduce exhaust NOx amounts. As such, this may lead to a temporary increase in exhaust $CO_2$ levels, and a temporary drop in fuel economy.

In one example, where the train includes a plurality of locomotives, the engine injection timing for each locomotive is adjusted based on the ambient NOx level of each locomotive. In one example, the adjustment includes retarding an injection timing of each locomotive as the ambient NOx of each corresponding locomotive exceeds a threshold. In an alternate example, the engine injection timing for a remote locomotive is adjusted based on the ambient NOx level of a lead locomotive estimated by a NOx sensor in the engine intake of the lead locomotive. For example, the adjustment may include retarding an injection timing of each remote locomotive as the ambient NOx level of the lead locomotive exceeds a threshold.

Additionally, or optionally, the engine injection timing of each locomotive can be adjusted based on the train's configuration and the location of a given locomotive in the train consist. For example, in response to an ambient NOx level exceeding a threshold, the injection timing of a remote locomotive may be retarded more as the distance of the locomotive from a lead locomotive increases. That is, in response to an ambient NOx level of a lead locomotive exceeding a threshold, the injection timing of a first remote locomotive at a first, smaller distance from the lead locomotive may be retarded by a first, smaller amount, while the injection timing of a second remote locomotive at a second, larger distance from the lead locomotive may be retarded by a second, larger amount.

In comparison, if the estimated ambient NOx level does not exceed the threshold, that is, NOx levels in the air are low, then at 512, engine operations are adjusted to allow the engine to make more exhaust NOx while reducing exhaust $CO_2$ levels, and improving fuel economy. In one example, this includes advancing engine injection timing or retarding injection timing by a second amount, smaller than the first amount, thereby increasing vehicle fuel economy, when the ambient NOx level is lower than the threshold. In other words, an exhaust NOx level is reduced when an ambient NOx level is greater than a threshold, and an exhaust $CO_2$ level is reduced when an ambient NOx level is greater than the threshold. Herein, by making more exhaust NOx when ambient levels are lower, the engine is able to improve its fuel economy while remaining NOx emissions compliant. In either case, by adjusting engine operations based on regional air quality, on a real-time basis, a better trade-off between fuel economy and exhaust emissions is achieved.

In an alternate embodiment, adjusting engine operations includes adjusting an amount of emission control device fluid (such as reductant) injected upstream of the exhaust emission control device. The adjustment may include increasing or decreasing an amount of reductant injected upstream of the emission control device as the ambient regulated emissions level increases, the adjustment based on the selected regulated emissions. Still other engine adjustments may be possible.

The estimated ambient NOx levels can also be used for diagnostic purposes. Specifically, at 516, an exhaust NOx level is estimated and/or measured. In one example, the exhaust NOx level is inferred based on engine operating conditions and the ambient (or intake) NOx level. In another example, the exhaust NOx level is estimated by a second NOx sensor in the engine exhaust. At 518, the ambient NOx level is compared to the exhaust NOx level and it is determined whether the difference is greater than a threshold. At 520, degradation is indicated in response to a difference between the ambient NOx level and the exhaust NOx level exceeding a threshold. Degradation may be indicated, for example, by setting a diagnostic code or illuminating a degradation indication light. If the difference does not exceed the threshold, then the routine may end.

Thus, in an embodiment, a method of operating an off-highway vehicle engine may comprise adjusting an engine injection timing based on an ambient NOx level estimated by a first NOx sensor in an engine intake of the off-highway vehicle, and indicating degradation in response to a difference between the ambient NOx level and an exhaust NOx level exceeding a threshold. In another embodiment, a method comprises adjusting an engine injection timing of the train based on an ambient regulated emissions level estimated by a first regulated emissions sensor in an engine intake, and indicating degradation in response to a difference between the ambient regulated emissions level and an exhaust regulated emissions level being greater than a threshold, where the exhaust regulated emissions level is estimated by a second regulated emissions sensor in an engine exhaust and/or inferred based on engine operating conditions.

While the method of FIG. 5 illustrates adjusting engine operations based on an ambient NOx level, it will be appreciated that this is not meant in a limiting sense, and that in alternate embodiments, an engine injection timing of one or more locomotives of the train may be adjusted based on an ambient level of one or more other regulated emissions, such as one or more of S, CO, $CO_2$, PMs, NOx, etc., the ambient regulated emissions level estimated by a (first) regulated emissions sensor in the engine intake. For example, the adjustment may include, retarding an engine injection timing to reduce an exhaust regulated emissions level when the ambient regulated emissions level is greater than a threshold. Further, degradation may be indicated in response to a difference between the ambient regulated emissions level and an exhaust regulated emissions level being greater than a threshold. The exhaust regulated emissions level may be estimated by a (second) regulated emissions sensor in the engine exhaust and/or inferred based on engine operating conditions.

In one example, a train system may include a first lead locomotive with a first NOx sensor in the engine intake of the first lead locomotive. The train system may further include a second remote locomotive with a second NOx sensor in the engine intake of the second remote locomotive. One or more cars may be coupled between the first lead locomotive and the second remote locomotive. A control system may be included having computer readable storage medium with code therein. The code may carry instructions for adjusting an engine injection timing of the first lead locomotive and the second remote locomotive based on an ambient NOx level estimated by the first NOx sensor in the first lead locomotive. The adjustment may include retarding an engine injection timing of the first locomotive and the second remote locomotive as the ambient NOx level estimated by the first NOx sensor exceeds a threshold. An engine injection timing of the second remote locomotive may be further retarded as a number of cars between the first lead locomotive and the second remote locomotive increases. In an alternate example, an engine injection timing of the first lead locomotive may be retarded as the ambient NOx level estimated by the first NOx sensor exceeds a threshold, while an engine injection timing of the second remote locomotive may be retarded as the ambient NOx level estimated by the second NOx sensor exceeds a threshold. In either example, the injection timing of the first lead locomotive and the second remote locomotive may be further retarded when the train passes through a tunnel.

In this way, by reducing NOx emissions in areas with higher concentrations of NOx, and allowing higher NOx emissions in areas with lower concentrations of NOx, an engine may be better optimized for trade-offs between fuel economy and exhaust emissions. While the depicted embodiment shows determining an ambient NOx level based on the input from an intake sensor, it will be appreciated that in alternate embodiments, information pertaining to a local air quality may be additionally supplied from a positioning device, such as a GPS device in communication with a satellite, the satellite downloading data from a local air quality station. Herein, the positioning device may indicate the presence of NOx-sensitive zones (such as high NOx and low NOx zones) to the vehicle operator. However, by adjusting engine operations in real-time, based on local NOx levels determined by an intake NOx sensor, the controller may adjust engine operations without being constrained by geographic boundaries.

Now turning to FIG. 4, an example routine 400 is described for adjusting train operations based on deviations of an actual notch duty cycle from a reference duty cycle (such as an emissions-based EPA duty cycle). As previously elaborated, government regulations pertaining to the maintenance of NOx emissions can require locomotives to adhere to reference notch duty cycles, such as an EPA standard notch duty cycle. As such, a time in notch duty cycle reflects the time spent by a locomotive engine at a given notch over the engine's duty cycle. However, on some routes, or at least on some segments of some routes, the actual duty cycle may differ from the reference duty cycle. Herein, adjustments may be made to train operations based on the deviation of the actual duty cycle from the reference duty cycle. Specifically, by looking at the historical data for the route, engine operating parameters for a locomotive, such as an injection timing, a timing or speed trajectory, and a notch duty cycle may be adjusted independently, or together, to tune the engine towards the reference duty cycle, while providing the desired NOx performance. In some examples, the engine operations for various trains or locomotives of a fleet may be coordinated to enable management of the fleet while maintaining a NOx level for the fleet.

At 402, train operating details and operator preferences may be received. In one example, the operating details and preferences may be downloaded from a controller at a remotely located dispatch center. Alternatively, the details and preferences may be input into a locomotive controller by an operator at the dispatch center, or an operator on-board the train. The train operating conditions may include, for example, operating conditions at the time of train dispatch, as well as anticipated vehicle operating conditions over the duration of the travel. The train operating details received may include, but are not limited to, train configuration (e.g., number and location of locomotive consists), locomotive loads, planned travel route, number of stops, track details along planned travel route, weather details along planned travel route, etc. The conditions may be measured, estimated and/or inferred, for example, from various sensors on the train or locomotive (as previously elaborated in FIG. 2), track databases, train journey databases (for example, of the same train or of different trains travelling the same route), global positioning systems, individual locomotive databases, fleet databases, weather databases, infrastructure databases, etc. Other information may include, for example, train position, consist description (e.g., locomotive models, age, length, tonnage, horsepower, etc.), car makeup (number of cars, type of cargo, tonnage, etc.), train marshalling, effective drag coefficients, desired trip parameters (e.g., desired speed range, desired start time and location, desired end time and location, desired travel time, desired number and location of stops, crew identification, crew shift expiration times, desired route, etc.), locomotive power description, performance history of locomotive traction transmission, engine fuel consumption as a function of output power, cooling characteristics, intended trip route, terrain characteristics of trip route, effective track grade and curvature as a function of milepost (or an effective grade), etc. Further still, historical data pertaining to the planned travel route may also be determined (e.g., received or downloaded). The historical data may include, for example, the route traveled, direction of travel, manifest data (e.g., weight of manifest, etc.), the time in notch duty cycle actually used, injection timing adjustments, speed trajectories used, NOx levels along the route, etc.

Operator inputs received may include, for example, cost functions and constraints for the different locomotive consists, limits and constraints that may be imposed based on the planned travel route, the destination, the stops, etc. The limits and constraints may include weighted preferences for fuel economy, exhaust emissions, time constraints, etc. In one example, the constraints and limits, including their weightings, may be stored in a look-up table and accessed based on the train operating details received at 402. Additionally or optionally, cost functions and limits may be directly input to a controller by a train operator.

Based on the details received pertaining to operating conditions and operator preferences, at 404, a first trip plan over a route is determined. In one example, a trip plan may be generated using trip optimization software, such as Trip Optimizer™ available from General Electric Company. For example, some aspects of the present invention may utilize, or be implemented using, certain of the concepts set forth in U.S. Publication No. 20070219680A1, dated Sep. 20, 2007. At 406, a (first) time in notch duty cycle is determined for the first trip plan. Specifically, the (first) time in notch duty cycle details the amount of time that is spent by the locomotive engine at a given notch over the engine duty cycle. At 408, the time in notch duty cycle is compared to a reference duty cycle, such as an EPA duty cycle. As such, the reference duty cycle includes predefined amounts of time that the engine should spend at predefined notches so as to maintain overall emissions compliance. For example, to maintain exhaust NOx levels within a threshold and keep the train emissions compliant, an EPA duty cycle may mandate being in an upper notch (such as N8) 16% of the time, being in a lower notch (such as DB) 12.5% of the time, and being in idle 38% of the time. However, the actual duty cycle for the trip plan may deviate from the reference duty cycle based on route of travel, direction of travel, locomotive type, horsepower per ton, operator-selected changes, manifest details, etc. As such, operating points off the referenced EPA duty cycle may not be optimized for fuel economy due to the small amount of time spent in lower notches. However, all notches may be required to conform to the reference duty cycle so as not to exceed emission limits independent of the duty cycle.

At 410, the actual time in notch duty cycle may be compared to the reference duty cycle, and it may be determined whether the deviation from the reference duty cycle is greater than a threshold. If the deviation is not greater than the threshold, then at 412, the train may be operated according to the determined trip plan (i.e., the first trip plan determined at 404) and at 414, a locomotive controller may keep track of train emissions over the trip plan and report any emissions credits earned over the trip plan. For example, emissions credits may be earned for segments of the travelled route where engine emissions (such as NOx emissions) are lower than a threshold. The earned credits may be based on the duration of the route over which the NOx emissions were lower than the threshold, as well as based on the difference of the actual exhaust NOx levels from the threshold. Thus, more emissions credits may be earned as the amount of time that the engine exhaust emissions remain below the threshold increases, and also as the difference between the exhaust emissions and the threshold increases.

In case of deviation of the (first) time in notch duty cycle from the reference being greater than the threshold, at 416, the locomotive controller may selectively adjust the first trip plan to a second trip plan based on the deviation from the reference duty cycle and operate the locomotive according to the second plan. In one example, at 418, this includes, during a first condition, adjusting locomotive settings of the first trip plan over the entire route to generate a second trip plan with a second time in notch duty cycle closer to the reference duty cycle. For example, the trip plan may be completely re-optimized over the entire route with reconfigured constraints and cost functions. The re-optimization may include, for example, re-optimizing a first trip plan that was optimized for fuel economy to a second trip plan that is optimized for fuel economy and exhaust emissions. In another example, a first trip plan may have been optimized with a relatively higher weight for fuel economy and a relatively lower weight for exhaust emissions, while a second trip plan may be optimized with a relatively lower (than in the first trip plan) weight for fuel economy and a relatively higher weight for exhaust emissions. Herein, the first trip plan is reconfigured.

In an alternate example, at 420, adjusting the trip plan may include, during a second condition, adjusting locomotive settings of the first trip plan over a portion (or segment) of the route to generate a second trip plan with a second time in notch duty cycle closer to the reference duty cycle. Herein, the time in notch duty cycle of the re-optimized plan is adjusted closer to the reference duty cycle as and where possible. In other words, the first trip plan is adjusted to nudge the duty closer to the reference duty cycle, without reconfiguring the whole trip plan. In one example, where the reference duty cycle advocates being in notch 7 for a predefined duration, the actual duty cycle is adjusted so as to straddle notch 7, for example, by shifting between notches 6 and 8, for the predefined duration. In another example, certain notches may be penalized more heavily than others. For example, notches that are used less may be penalized more while notches that are used more may be penalized less.

The adjustments to the trip plan at 416 (that is, during the first condition at 418, or the second condition at 420), may be based on the deviation from the reference duty cycle and further based on historical data of locomotive over the (traveled or selected) route. For example, the adjustments responsive to deviation of the actual time in notch duty cycle from the reference duty cycle may be based on the historical time in notch duty cycle. In one example, the controller looks back at historical data for the traveled route and based on time in notch duty cycle adjustments, and related engine operating parameter adjustments, the controller performs adjustments for the current time in notch duty cycle. In one example, the controller keeps the notch output fixed and adjusts one or more of an engine duty cycle, an engine injection timing, and an engine timing or speed trajectory, independently or together, to achieve a desired engine NOx performance.

It will be appreciated that while the example depicts adjusting the time in notch duty cycle for a locomotive, this is not meant in a limiting sense, and that similar adjustments may be performed for fleet management. For example, the controller may manage a fleet (including a plurality of trains, locomotives, and locomotive consists over a plurality of routes) to achieve a desired NOx level for the fleet. Herein, the travel plans and routes for each of the plurality of locomotives may be considered and accordingly adjustments may be made to achieve overall fleet emissions compliance. In one example, the travel plan, engine injection timings, traveled route, timing and/or speed settings and trajectories, nature of locomotive service (e.g., coal service or light service), notches, actual time in notch duty cycles, etc., may be received by a controller at a central database. The controller may then optimize overall fleet emissions (such as, overall fleet NOx emissions) by adjusting engine operating parameters for each locomotive of the fleet, including adjustments to each locomotive's engine injection timing, duty cycle, and timing/speed trajectory. The adjustments may be at least in part based on the historical data of each locomotive for the traveled route, as well as based on historical data pertaining to the fleet.

In one example, if a controller determines that a coal service locomotive of the fleet has an actual time in notch duty cycle that is different from the reference duty cycle, the controller may adjust the injection timing of one of more fleet locomotive engines based on the expected or planned duty cycle for better fuel economy, better engine performance, etc. In another example, if a controller determines that a light service locomotive of the fleet has an actual time in notch duty cycle that is different from the reference duty cycle, the controller may only adjust the injection timing of the given locomotive.

In some cases, it may not be possible (for time or other constraints) to adjust the first trip by fully or partially reconfiguring the trip plan. Thus during a third condition, as shown at 422, a locomotive controller may not adjust the first trip plan, and the train may continue to be operated according to the original first trip plan with no changes. As such, in each of the first, second, and third conditions, emission credits can be earned or applied. Specifically, the locomotive controller may keep track of emissions over the duration of the trip plan and may report any emissions credits if any are earned, and may apply any emissions credits, if any are available from the current or previous train operations, as and when possible. In this way, by adjusting a trip plan based on a deviation from a reference duty cycle, optimizations based on trade-offs between exhaust emissions and fuel economy may be improved.

Where embodiments are described herein in reference to locomotives, such embodiments are also applicable to rail vehicles generally (e.g., engine powered ore carts, trolleys, and the like).

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims. Moreover, unless specifically stated otherwise, any use of the terms first, second, etc., do not denote any order or importance, but rather the terms first, second, etc. are used to distinguish one element from another.

The invention claimed is:

1. A method of operating a combustion engine, the method comprising,
adjusting an engine injection timing based on an ambient NOx level estimated by a first NOx sensor coupled with an engine intake.

2. The method of claim 1, wherein the adjustment includes, retarding injection timing as the ambient NOx level exceeds a threshold.

3. The method of claim 2, wherein the adjustment further includes, increasing vehicle fuel economy when the ambient NOx level is lower than the threshold.

4. The method of claim 1, further comprising, indicating degradation in response to a difference between the ambient NOx level and an exhaust NOx level exceeding a threshold.

5. The method of claim 4, wherein the exhaust NOx level is estimated by a second NOx sensor in an engine exhaust.

6. The method of claim 4, wherein the exhaust NOx level is inferred based on engine operating conditions including engine speed and load.

7. The method of claim 1, wherein the combustion engine is included in an off-highway vehicle, the off-highway vehicle including a train with a plurality of locomotives, an ambient NOx level for each locomotive estimated by a NOx sensor in the engine intake of each locomotive.

8. The method of claim 7, wherein the adjustment includes adjusting an engine injection timing for each locomotive based on the ambient NOx level of each locomotive, and further based on a location of the locomotive.

9. The method of claim 8, wherein the adjustment includes retarding an injection timing of each locomotive as the ambient NOx level of each locomotive exceeds a threshold.

10. The method of claim 8, wherein a threshold for each locomotive is adjusted based on a distance from a lead locomotive.

11. The method of claim 9, wherein the adjustment includes increasing the threshold for a locomotive as the distance from the lead locomotive increases.

12. The method of claim 10, further comprising, further increasing the threshold when the train is in a tunnel.

13. A method of operating a train, comprising,
adjusting an engine injection timing of the train based on an ambient regulated emissions level estimated by a regulated emissions sensor in an engine intake.

14. The method of claim 13, wherein the regulated emissions includes one or more of NOx, $CO_2$, CO, S, and particulate matters (PMs).

15. The method of claim 14, wherein the adjustment includes retarding an injection timing to reduce an exhaust regulated emissions level when the ambient regulated emissions level is greater than a threshold.

16. The method of claim 14, wherein the adjustment includes retarding an injection timing to reduce an exhaust NOx level when an ambient NOx level is greater than a threshold; and adjusting an injection timing to reduce an exhaust $CO_2$ level when the ambient NOx level is lower than the threshold.

17. The method of claim 15, further comprising, indicating degradation in response to a difference between the ambient regulated emissions level and an exhaust regulated emissions level being greater than a threshold, the exhaust regulated emissions level estimated by a second regulated emissions sensor in an engine exhaust and/or inferred based on engine operating conditions.

18. A train system, comprising,
a first lead locomotive, an engine intake of the first lead locomotive including a first NOx sensor;
a second remote locomotive, an engine intake of the second remote locomotive including a second NOx sensor;
one or more cars coupled between the first lead locomotive and the second remote locomotive; and
a control system having computer readable storage medium with code therein, the code carrying instructions for,
adjusting an engine injection timing of the first lead locomotive and the second remote locomotive based on an ambient NOx level estimated by the first NOx sensor.

19. The system of claim 18, wherein the adjustment includes, retarding an engine injection timing of the first lead locomotive and the second remote locomotive as the ambient NOx level estimated by the first NOx sensor exceeds a threshold.

20. The system of claim 19, wherein the control system further includes code for further retarding an engine injection timing of the second remote locomotive as a number of cars between the first lead locomotive and the second remote locomotive increases.

21. The system of claim 19, wherein the engine injection timing of the first lead locomotive and the second remote locomotive is further retarded when passing through a tunnel.

* * * * *